May 19, 1970 R. B. ENGLISH ET AL 3,512,200
ARTICLE TREATING APPARATUS AND BRUSH ROLL CONSTRUCTION THEREFOR
Filed May 9, 1968 2 Sheets-Sheet 1
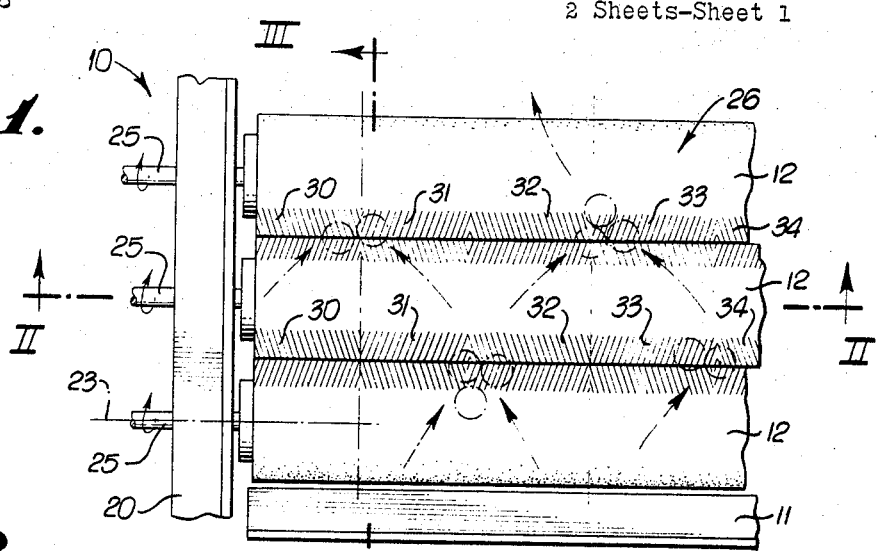
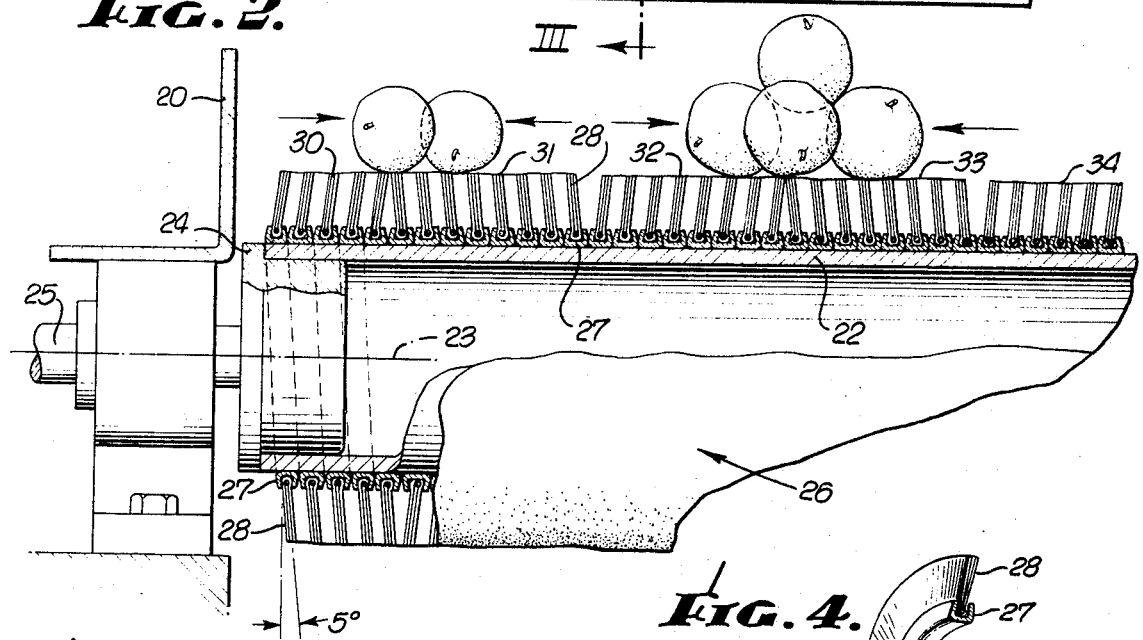
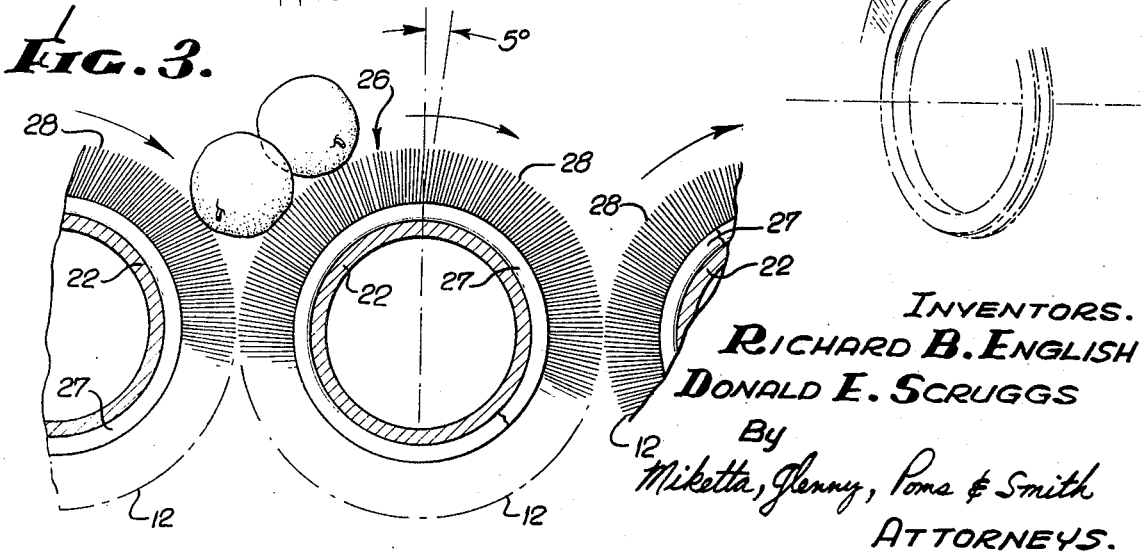
INVENTORS.
RICHARD B. ENGLISH
DONALD E. SCRUGGS
By
Miketta, Glenny, Pons & Smith
ATTORNEYS.

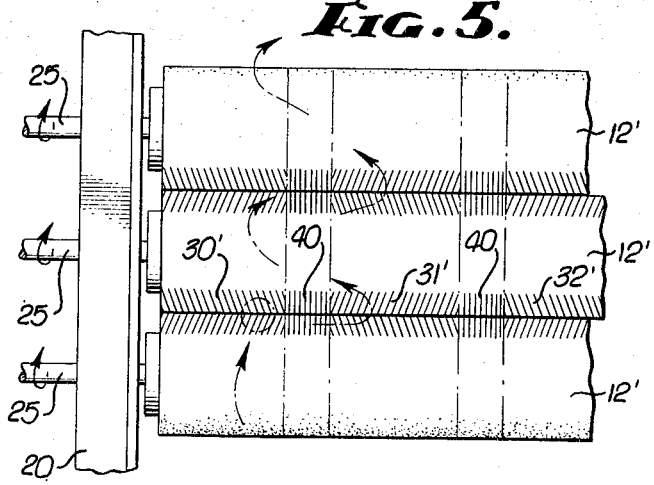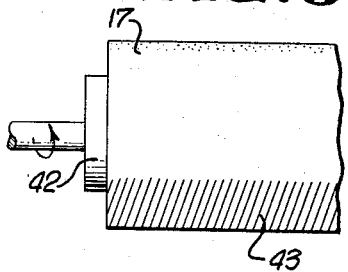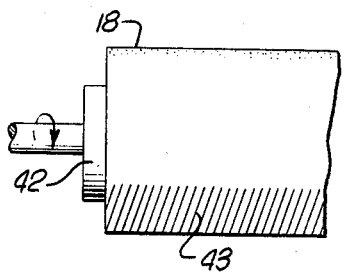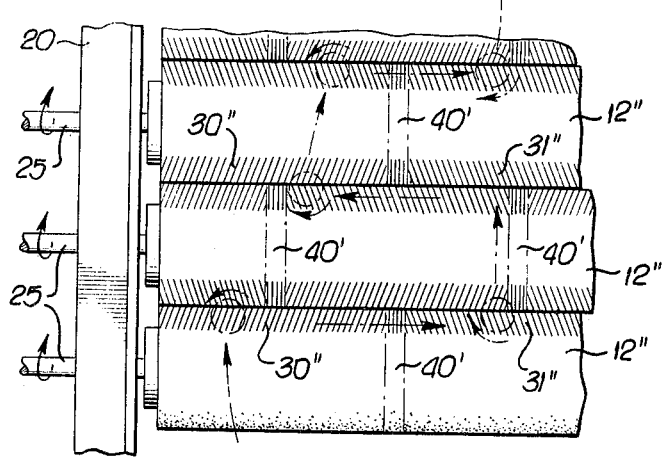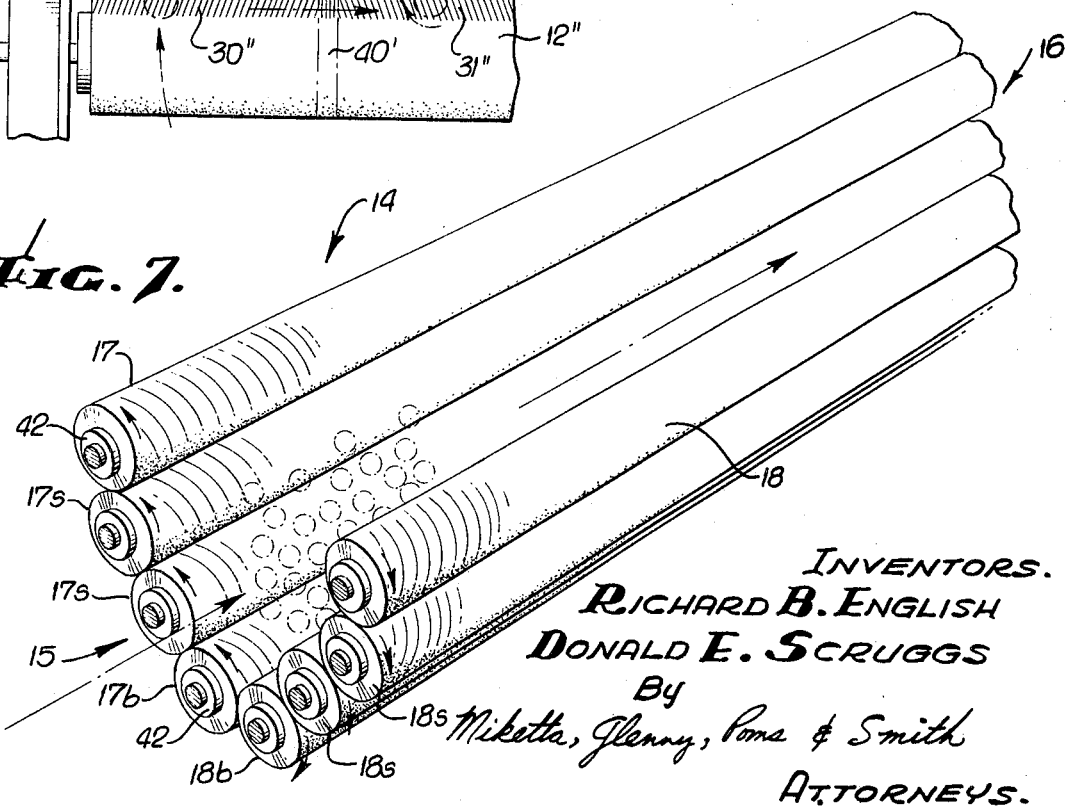

United States Patent Office 3,512,200
Patented May 19, 1970

---

3,512,200
ARTICLE TREATING APPARATUS AND BRUSH
ROLL CONSTRUCTION THEREFOR
Richard B. English, Pasadena, and Donald E. Scruggs,
El Monte, Calif., assignors to Industrial Brush Company, Pomona, Calif., a corporation of California
Filed May 9, 1968, Ser. No. 727,981
Int. Cl. A23n 13/00; A46b 9/02
U.S. Cl. 15—3.17
19 Claims

ABSTRACT OF THE DISCLOSURE

An apparatus and a brush roll construction for treating fruit, produce, globular articles and the like comprising a plurality of brush rolls having brush filament sections arranged in a selected pattern, each section comprising filament elements inclined longitudinally in the direction of the axis of the brush roll and also inclined in the direction of rotation of the brush roll whereby the path of travel of an article is substantially determined and during said travel the surface of said article is subjected to vigorous cleaning and treatment by the filament elements, the article being actively and vigorously tumbled by said brush rolls.

Background of the invention

Citrus fruit and various types of produce are often cleaned by moving the fruit along a conveyor brush roll means which includes a plurality of brush rolls arranged with their axes parallel and having bristle means extending into close relationship with an adjacent roll to support and turn the article as it is conveyed along the roll means. In some conveyor constructions the articles may be directed transversely of the brush rolls and in others the articles may be moved longitudinally of the rolls. In prior proposed brush roll apparatuses, the brush rolls have been made of cylindrical form and/or of various configured forms. An example of a cylindrical brush form is shown in Jones 2,924,838 in which bristles of the brush strip are uniformly inclined longitudinally in one direction for the length of one roll member and then in the opposite direction for the length of the other roll member so that the fruit fed transversely to the rolls will follow a zig-zag path across a plurality of such rolls. Such zig-zag movement of a fruit across the plurality of rolls continually turned the fruit for the purpose of exposing the entire surface of the fruit to a brush cleaning action.

In other prior proposed brush cleaning roll constructions the surface formed by the bristle ends were configured or sculptured in order to impart additional movement to a fruit as it passed along the brush rolls. An example of such brush roll construction is Paxton 2,099,222 and Jones 3,199,134. In such configured brush constructions it is readily apparent that the configurations required cutting and removing bristle material, the configurations were required to match or mate in at least some respect so that fruit would not fall between the brush rolls and be damaged, bruised, or lost, and bristle wear often resulted in changed configurations which made brush cleaning less effective.

In other prior proposed brush rolls it has usually been deemed desirable to form a brush roll with the bristles extending radially, that is, along radians. In early tufted brush constructions the bristles in the tuft generally flared outwardly and thus there were some outer tuft bristles which were disposed at an angle to the axis of the tuft. The resultant effect of adjacent tufts, however, with respect to the surface of an article supported by said tufts was essentially that of the central portion of the tuft since outer bristles of one tuft were supported or counteracted upon by outer bristles of the adjacent tuft. In prior proposed brush constructions employing a continuous brush strip wherein bristles extend in a planar layer from the strip member outward flaring of edge bristles from the plane of the strip was not great and adjacent brush strips tended to support and maintain the bristle layers in essentially a plane normal to, or a helical path along, the axis of the brush roll. It will be apparent that in such prior proposed brush rolls the support and contact of an article on the bristles would generally cause some bending of the bristles so that bristle end portions would merely lay against the surface of the article and exert thereagainst a relatively soft, sweeping or brushing action (which in some cases may have been desirable) rather than imparting a vigorous, forceful agitation of the article.

The present invention is directed to a novel brush roll construction which includes all of the desirable advantages of the prior constructions mentioned above and additionally provides a positive control over the path taken by a plurality of articles passing over the present brush roll construction and at the same time imparts to an article a vigorous agitated tumbling action and surface cleaning action.

The present brush roll construction embodies an arrangement of filament elements so that virtually each filament element is positioned so that upon rotation of the roll its tip end face will be forced against the surface of an article, the principal force component acting essentially along the axis of the filament element so that the columnar strength and compressive forces of the filament element may be employed for cleaning the surface of the article. In addition the imparting of such a force to the surface of an article supported by filament sections each having elements inclined with respect to a radian and longitudinally or axially extending for a distance greater than the major dimension of the article produces a rapid effective cleaning action as well as a vigorous agitation and tumbling of the article so that virtually all surface areas of the article are rapidly presented to the brush filament elements.

The invention also contemplates an apparatus for cleaning globular articles wherein the articles are imparted a force which causes them to move in a selected direction and in addition are imparted forces which cause spaced articles to press against articles therebetween in a direction lateral to the direction of their main path of travel so that the article receiving such pressure or squeezing action is caused to be vigorously displaced and tumbled over an adjacent brush roll.

The primary object of the present invention is to disclose and provide an apparatus for treating and cleaning globular articles such as citrus fruit and various produce and a brush roll construction of novel, inexpensive, yet effective design.

An object of the invention is to disclose and provide a brush roll construction wherein each filament element is disposed for effective cleaning action against the surface of a fruit supported thereby.

Another object of the present invention is to disclose and provide a roll construction wherein brush rolls of cylindrical configuration coact with globular articles supported thereby to move the articles in an agitated manner along predetermined paths.

Another object of the present invention is to disclose and provide an apparatus for treating citrus fruit including a plurality of transversely arranged parallel brush rolls wherein said brush rolls include filament end sections which prevent fruit from contacting, scraping and being damaged by side walls of the apparatus.

Another object of the invention is to disclose and provide an apparatus as mentioned above wherein the filament elements are arranged in filament sections so as to transversely or laterally direct articles against each other to cause effective rapid turning and tumbling movement of articles supported by said brush rolls for effectively submitting the entire surface of the article to the filament elements on the brush roll.

Specific objects of the present invention include the construction of a brush roll having a rotatable core member wherein filament means are arranged on the core member in filament sections, each filament section having filament elements inclined longitudinally to the axis of the brush roll and inclined radially in the direction of rotation of the core member whereby the bristle end face is driven by rotation of the core member against the surface of a globular article being treated.

Other objects and advantages of the present invention will be readily apparent from the following description of the drawings in which an exemplary embodiment of the invention is shown.

In the drawings:

FIG. 1 is a fragmentary top plan view of an article treating apparatus embodying the present invention.

FIG. 2 is an enlarged fragmentary sectional view taken generally in the plane indicated by line II—II of FIG. 1.

FIG. 3 is an enlarged fragmentary sectional view taken in the longitudinal vertical plane indicated by line III—III of FIG. 1.

FIG. 4 is a fragmentary perspective view of a brush means indicating inclination of the brush filaments disposed according to this invention.

FIG. 5 is a fragmentary top plan view of a brush roll assembly embodying a different pattern of filament sections.

FIG. 6 is a fragmentary top plan view of still another variation of the brush filament section pattern arrangement.

FIG. 7 is a fragmentary perspective view of a different arrangement of brush roll assemblies in which articles are treated and passed longitudinally of the brush rolls.

FIG. 8 is a fragmentary end view of one of the brush rolls of FIG. 7.

FIG. 9 is a fragmentary end view of a different brush roll of FIG. 7.

In the drawings, brush roll constructions embodying the present invention are shown in FIG. 1 and FIG. 7. The apparatus generally indicated at 10 (FIG. 1) shows brush roll constructions embodying this invention arranged for passage of a globular article such as citrus fruit from an inlet end 11 transverse to the plurality of brush rolls 12. The passage of the fruit transversely of the rolls 12 is described hereafter in detail. The apparatus 14 (FIG. 7) shows a different arrangement of brush rolls wherein produce or globular articles to be treated are introduced at an inlet end 15 for passage longitudinally of the brush rolls to a discharge end 16. Brush rolls 17 and 18 embody an exemplary roll construction of the present invention as later described in detail.

Apparatus 10 may comprise in addition to the parallel brush rolls 12 a suitable frame construction including side guard rails 20 at ends of rolls 12 to define side limits of an article conveyor and treating bed formed by the rolls 12. Apparatus 10 may also include suitable drive means such as a motor, drive chain and gears connected with suitable sprockets on ends of each roll 12 for rotating all of rolls 12 in the same direction and indicated as clockwise in FIG. 3. Such drive means is well known and is therefore not described.

Each brush roll construction 12 may include a rotatable cylindrical core member 22 which has a longitudinal axis 23 and which may include suitable end walls 24 and axle portions 25 extending therefrom for rotatably mounting core member 12 in suitable manner. It will be understood that various types of rotatable core member constructions may be employed.

Brush filament means generally indicated at 26 may comprise a continuous brush strip having a generally channel or U-section brush strip base member 27 in which may be folded bristles or filament elements 28 which extend outwardly from the base member and away from axis 23 of the core member. The filament elements 28 may be of natural or synthetic materials and may be secured by a wire core member within the channel section member in well known manner.

Brush filament means 26 on a brush roll 12 may be readily continuously wound thereon in either a right or left hand direction as by turning an assembled brush means 26 about a mandrel. In this example brush means 26 is wound so that end filament sections 30 (shown at one end of roll 12, the opposite end being similar) are provided with their filament elements 28 inclined toward the inboard or central portion of the brush roll and in the direction of the longitudinal axis 23 of core member 22. Between end sections 30 may be provided one or more intermediate sections 31, 32, 33, 34, etc. Each of said intermediate filament sections includes a similar brush strip 27 and may be a continuous winding of the brush strip 27 of the adjacent section. In this example, each of the said filament sections include filaments 28 inclined in a direction opposite to that of the adjacent filament section and longitudinally of the axis 23. Thus, in FIG. 2 section 31 adjacent to end section 30 includes filament elements inclined oppositely to the direction of inclination of elements of section 30. Filament section 32 includes elements 28 inclined opposite to the elements of section 31 and similarly 33 includes elements inclined opposite to that of section 32. It will thus be apparent that sections 32 and 33 provide a central brush roll zone where the change in inclined direction of the filament elements occur and that sections 32 and 33 with opposite longitudinal inclination of elements 28 define an article pressure zone serving purposes later described.

In addition to longitudinal inclination of filament elements 28 to axis 23 the filament elements of all of the sections 30–34, etc., are inclined with respect to a radian of core member 22 and in the direction of rotation of the brush rolls. Such inclination to a radian may be produced in a continuous brush strip by positioning the filament elements 28 in the strip member before turning about a mandrel with a forward or rearwardly directed rake of preselected angle, such as 5°. With such a rake angle the strip base member 27 may be wound on the mandrel, the longitudinal inclination being provided by inclining the strip base member in the selected axial direction. Even though inclination of elements 28 may change as from end section to intermediate section, the winding of the base strip member in a continuous helical path of selected pitch is uninterrupted. Thus, each filament element has a selected rake angle and elements along the helical path will incline longitudinally to the axis of the core member in alternate fashion.

As shown in FIG. 3 such inclination to a radian of the core member 22 provides a bristle or filament tip portion which is longitudinally directed against the opposed surface area of a globular article being treated. Preferably the inclination in the direction of rotation of the brush rolls is such that each filament element when contacting the globular article is lying along a straight line from the brush strip base member to the tip end of the filament element. Thus, maximum columnar strength and compressive forces of the filament elements are used to transmit a component of the rotative force to the article. In FIG. 3 it will be apparent that the rotation of the second roll in the series of rolls will drive a filament element against the globular article to cause it to be directed upwardly as well as laterally thereby causing a twisting and a turning of the article in the valley between the adjacent brush rolls.

In operation of apparatus 10 in which the brush rolls may be arranged with their axes lying in a horizontal plane or in a slightly inclined plane either upwardly or downwardly with respect to the path of travel of the fruit, the fruit may be fed in selected quantity from a conveyor (not shown) over a delivery board at 11 to the brush rolls 12. Preferably the quantity of fruit fed to the apparatus is sufficient to fill the valleys between the rolls so that a large quantity of fruit may be rapidly efficiently treated. Only a few fruit are shown for purposes of clarity and for describing the particular action to which the fruit are subjected by the inclination in two directions of filament elements 28 of the invention.

As fruit are fed to rolls 12, the first roll 12 advances the fruit to the first valley formed by first and second rolls 12 (FIG. 3). Considering the effect of the rake angle first, it will be apparent that the lowermost fruit which is in contact with elements 28 of both brush rolls 12 is subjected to a counterclockwise rotative component of force because elements 28 of both brush rolls, at their tip portions drive against the surface of the fruit at a point below the center of the fruit. Because of the rake angle of elements 28 the tip portions of elements 28 of the second roll impart an upward striking columnar force component against the surface of the fruit instead of a soft wiping or sweeping action on the surface of the fruit. At the same time the filament elements 28 of the first brush roll 12 are striking an opposed surface of the fruit in a similar manner but not in such a direct manner (i.e., the axis of element 28 is not normal to a tangent to the fruit surface). Thus, the fruit is imparted a vigorous counter-clockwise rotative action since the coaction of the fruit with respect to the clockwise rotation of the brush rolls provides such counter rotation. Other surfaces of the fruit are driven by such counter rotation against the advancing tip portions of elements 28 so as to impart a vigorous cleaning action on the fruit. In some instances it will be apparent that crowding of the fruit as it is being fed to the brush rolls will further act to press a fruit in the valley against the bristle tip porions of a succeeding brush roll. Such action not only further facilitates surface cleaning but also tends to push the fruit in the valley upwardly, out of the valley, and over the second brush roll into the valley between the second and third brush rolls.

The effect of the rake or inclination of the filament element 28 in the direction of rotation has been above described without correlation of element 28 to its longitudinal inclination with respect to the axis of the roll. Referring to FIGS. 1 and 2 longitudinal inclination of filaments 28 in end section 30 serves to urge and drive fruit away from the side guard rails 20 and toward the central portion of the brush roll assembly. Such action of an inclined filament element on a fruit has been indicated in Jones Pat. No. 2,924,838. With respect to end sections 30 such movement of the fruit away from the side guard rails tends to automatically prevent spillage of fruit over the side rails as the mass of fruit is conveyed along apparatus 10 and also tends to exert an overall inwardly side pressure against fruit mass throughout the length of the apparatus 10.

Intermediate filament sections 31, 32, etc., and particularly the pairs or sets of adjacent filament sections in which the filament elements 28 are inclined oppositely toward each other as indicated by filament sections 32, 33 which have been designated as an article pressure zone will now be described. Elements 28 in each of the two sections 32, 33 also include a selected rake angle. When a fruit is in contact with filament section 32, for example, which is inclined to the right as viewed in FIG. 2, it will be apparent that the inclination of elements 28 will move fruit toward the adjacent filament section 33. Similarly a fruit on filament section 33 will be urged toward adjacent filament section 32. During such lateral movement in the valley between rolls 12, such fruit are being turned counter-clockwise (FIG. 3) as well as having imparted to them a force component which tends to move the fruit laterally along the valley. As a fruit reaches the center of the pressure zone, that is, where sections 32, 33 meet, it will be followed by adjacent fruit which also move toward the center of the pressure zone because of longitudinal inclination of the elements 28 and such adjacent fruit will press against and squeeze intermediate fruit and exert pressure thereagainst tending to press and squeeze the fruit to impart turning and rotating of the fruit out of its normal rotative axis. When eillpsoidal fruit, such as a lemon, is treated, the fruit is turned about its minor axis and tumbled end over end so that the filament tip portions enter and clean end recesses and depressions in the fruit surface.

Since the action of filament elements 28 have imparted first a counter-clockwise rotational movement to the fruit and the longitudinal inclination of the elements have imparted a second lateral force component to the fruit it will be apparent that each element 28 will be loaded not only as a column (i.e., along the axis) but also subject to a bending, twisting or torsion loading (due to longitudinal inclination) by a fruit.

The above combination of force loading of elements 28 is indicative of a complex turning and twisting motion which is imparted to a fruit by the elements 28 in the absence of adjacent fruit. Even solitary fruit are thus imparted a turning, twisting motion for presenting the entire fruit surface to the brush rolls for treatment. Adjacent fruit in a mass of fruit, even though sized, may have a surface configuration which varies from each other fruit. The combination of complex forces imparted to the fruit by filament elements 28 and the continually varying surface pressure contact of one fruit against the other serves to produce a turning, tumbling, agitated movement of a fruit which rapidly and effectively causes presentation of the entire fruit surface area to filament elements 28 of the brush means 26.

As indicated in FIG. 1 fruit fed to brush rolls 12 at the boundaries of a pressure zone are caused to move laterally to either one side or the other of the zone boundary and into an adjacent pressure zone. The fruit, while being counter rotated, are urged laterally toward the center of the pressure zone and into pressure engagement with adjacent fruit; first, those fruit within their own zone, and then, fruit which have moved toward it from the opposite half of the pressure zone. During such movement globular articles even of irregular configuration and with a major dimension greatly exceeding a minor dimension, such as a lemon, are effectively tumbled, turned and agitated for effective cleaning. In this respect it should be noted that each of the sections 30, 31, 32, etc., have a section length on brush roll 12 which is greater than the major dimension or diameter of an article being treated so that more than one article will be subjected by the longitudinal inclination of the elements to movement in the same lateral direction.

In FIG. 5 a brush roll assembly providing a different article pattern of travel is shown. Brush rolls 12' may each include end filament sections 30' and intermediate sections 31', 32'. Between sections 30' and 31' and also between 31' and 32' are relatively narrow straight filament sections 40. Each filament section 30', 31', 32' may be constructed as described above having both longitudinal and radial inclination of elements 28. Straight sections 40 include filaments with radial inclination as in the prior embodiment but without longitudinal inclination.

Thus, as a fruit is driven from a section 31' toward straight section 40 and simultaneously another fruit is driven from section 30' toward section 40 between 30' and 31' the fruit will follow a path as generally indicated in FIG. 5 and in which fruit are caused to zig-zag back and forth across the straight section 40. Such a fruit movement pattern may be desirable with globular articles of certain configuration.

In FIG. 6 a still different arrangement of brush rolls 12" are shown in which straight sections 40' are transversely offset with respect to each other in adjacent rolls 12" to thus cause a further modification of the path of travel of the fruit as generally indicated by arrows. Thus, a fruit entering the first section 30" would be moved laterally away from the side rails and as it engaged a section 40' of the second roll the coaction between the inclined raked elements 28 of the first roll with the raked but not longitudinally inclined elements of the straight section 40' would produce a change and variation in the tumbling action of the fruit. As the fruit may proceed laterally away from straight section 40' it will be apparent that the inclination of section 31" of the second roll is opposite to that adjacent portion of the section 30" and as a result the fruit would be subjected to different force components (rake angles the same, but longitudinal inclinations opposite). As the fruit pass from one valley to another it can be readily seen that the path of the fruit varies considerably and that fruit would be subjected to tumbling and agitation in a different fashion than described heretofore.

It will be readily understood that while three various arrangements of filament sections of the brush rolls embodying this invention have been shown in FIGS. 1, 5 and 6 that other arrangements may be provided of the filament sections and elements. For example a brush roll construction may be provided with an end filament section having filaments inclined longitudinally toward the opposite end and all of the remaining filament elements on the brush roll may comprise a filament section in which all of the elements are inclined toward the first mentioned end. The angle of inclination and the angle of rake may, of course, be varied so as to provide the most effective brushing and cleaning action on the particular article, fruit or produce which is being cleaned.

In FIGS. 7, 8 and 9 is illustrated an example of an apparatus 14 embodying brush rolls constructed in accordance with this invention but treating articles as they are passed longitudinally of the rolls instead of transversely as above described. In FIG. 7 brush rolls 17 and 18 are arranged in sets of 4 with axes thereof forming an upwardly opening trough-shaped configuration so that articles fed thereto at inlet end 15 will be passed along bottom rolls 17b and 18b while at the same time being urged upwardly along and against side rolls 17s and 18s. Each roll 17 may comprise a brush strip means as mentioned in the prior embodiment wound continuously in a counter-clockwise or left hand direction as viewed in FIGS. 7 and 8 and continuously along the length of a supporting core member 42. Filament elements 43 may be inclined toward the discharge end 16 of the trough and may be raked or inclined in the direction of rotation as in the prior embodiment to effect a vigorous cleaning action. Roll 18 is similarly constructed except that the brush strip member is wound clockwise as indicated in FIGS. 7 and 9. Elements 43 may be longitudinally inclined and raked as hereinabove described for roll 17.

When a quantity of articles, fruit or produce are fed to inlet end 15 they will be urged by bottom rolls 17b and 18b towards end against side rolls 17s and 18s and upwardly therealong and toward the discharge end. The upward travel of the articles along the side rolls causes an exceptionally vigorous cleaning action because of the upward rake of the bristle elements which are driven against the articles which continually tend to fall downwardly by gravity. Thus, as the articles pass along the rolls, urged against the sides of the rolls, and fall downwardly, the articles are tumbled and turned in an extremely irregular fashion and are subjected to intense cleaning and scrubbing.

In the longitudinal disposition of rolls 17 and 18 in apparatus 14 it will be apparent that the axis of the rolls may be inclined downwardly or upwardly. When there is a slight upward inclination of the roll axes the fruit will travel upwardly between the rolls but will require a longer time to reach the discharge end and as a result will be subjected to a longer period of vigorous tumbling and brush cleaning action.

The provision of longitudinal and radial or rake inclination of filament elements to the axis of a brush roll and with the filament element tip portions being trimmed to form a cylindrical brush surface provides a brush roll construction which involves inexpensive simple changes in the usual procedure for making brush rolls of continuous brush strip while providing an effective efficient tumbling of an article being cleaned. The brush roll of this invention may thus include variations of the arrangement of filament sections, direction and amount of inclination of filament elements and arrangement of brush rolls and filament sections in parallel relation for travel of an article either transversely or longitudinally of the rolls. Brush rolls 12 may be rotated in the same direction or adjacent rolls in opposite directions. Interspersing one or more filament sections without longitudinal inclination of filament elements in the roll assembly for longitudinal travel of an article provides a stop or hesitation zone in the rate of travel of an article and therefore causes increased interaction between adjacent articles and brush filaments.

Various changes and modifications of the brush roll construction above described may be made and may come within the spirit of this invention, and all such changes coming within the scope of the appended claims are embraced thereby.

We claim:

1. In a brush roll construction for controlling the path of an article to be treated and for imparting an irregular tumbling action to such article to expose the entire surface of said article to brush treatment; the combination of:

at least two adjacent brush rolls, each including
   a rotatable core member defining a longitudinal axis;
   a brush strip member having spaced outwardly extending side walls;
   filament means carried by said brush strip member and including
   a filament section;
   said section having filament elements extending outwardly therefrom in a direction away from the axis of the core member,
   the filament elements in said section being longitudinally inclined in the direction of said axis; and
   the filament elements in said section being radially inclined and retained by said side walls in the direction of rotation of the core member.

2. A brush roll construction as stated in claim 1 wherein the inclination of said brush filament elements in both of said directions is in the order of 5°.

3. A brush roll construction as stated in claim 1 wherein each of said filament elements has a length whereby the tips of said filaments lie in a cylindrical surface generated coaxially about the axis of the core member.

4. In an apparatus for conveying and treating globular articles; comprising the combination of:

a plurality of brush rolls arranged with their longitudinal axes in parallel and in adjacent relation for supporting an article to be treated;

each brush roll including filament means comprising a plurality of filament sections, each of said filament sections having filament elements inclined in the direction of said longitudinal axis, adjacent filament sections having elements oppositely inclined, each section having a length greater than the article being treated;

whereby said filament sections force articles in opposite directions against each other and impart pressure through said articles to push an intermediate article into varying article axial positions.

5. An apparatus as stated in claim 4 wherein filament elements in said sections are inclined in the direction of rotation of said brush rolls.

6. An apparatus as stated in claim 4 wherein said filament sections include end sections having filament elements longitudinally inclined toward the central portion of said brush roll.

7. An apparatus as stated in claim 6 wherein said filament sections include intermediate sections between said end sections.

8. In an apparatus for conveying and treating globular articles; comprising the combination of:

a plurality of adjacent brush rolls arranged with their longitudinal axes in parallel;

and in adjacent relation for supporting an article to be treated;

each brush roll including filament means comprising filament elements longitudinally inclined in the direction of said axis;

the filament elements in said brush rolls being inclined in the same direction;

at least two of certain of the adjacent brush rolls being rotatable in one direction and at least two of the other of said adjacent brush rolls being rotated in an opposite direction.

9. An apparatus as stated in claim 1 including filament sections in spaced relation along said brush roll and having filament elements lying in a plane normal to the axis of the brush roll.

10. In a brush roll construction for controlling the path of an article to be treated and for imparting an irregular tumbling action to such article to expose the entire surface of said article to brush treatment; the combination of:

a rotatable core member defining a longitudinal axis; filament means on said core member and including a plurality of filament sections; each of said sections having filament elements extending outwardly therefrom in a direction away from the axis of the core member, the filament elements in said section being longitudinally inclined in the direction of said axis;

the filament elements in said section being radially inclined in the direction of rotation of the core member;

each of said filament sections having an axial length greater than the major dimension of an article being treated.

11. In a brush roll construction for controlling the path of an article to be treated and for imparting an irregular tumbling action to such article to expose the entire surface of said article to brush treatment; the combination of:

a rotatable core member defining a longitudinal axis; filament means on said core member and including a plurality of filament sections of selected axial length;

each filament section having filament elements extending outwardly therefrom in a direction away from the axis of the core member, the filament elements in said section being longitudinally inclined in the direction of said axis;

the filament elements in said section being radially inclined in the direction of rotation of the core member;

one filament section having its filament elements inclined toward one end of the core member; and an adjacent filament section having its filament elements inclined toward the opposite end of said core member.

12. In a brush roll construction for controlling the path of an article to be treated and for imparting an irregular tumbling action to such article to expose the entire surface of said article to brush treatment; the combination of:

a rotatable core member defining a longitudinal axis; filament means on said core member including a plurality of filament sections along the length of said core member, each of said filament sections having filament elements extending outwardly in a direction away from the axis of the core member, the filament elements in said section being longitudinally inclined in the direction of said axis;

the filament elements in said section being radially inclined in the direction of the rotation of the core member;

end filament sections having filament elements inclined toward the central portion of said core member; and filament sections intermediate said end sections, said intermediate sections having filament elements alternately inclined in directions opposite to said end sections to form article pressure zones along the length of said core member.

13. In an apparatus for conveying and treating globular articles; comprising the combination of:

a plurality of brush rolls arranged with their longitudinal axes in parallel; and in adjacent relation for supporting an article to be treated;

each brush roll including filament means comprising filament elements longitudinally inclined in the direction of said axis;

the filament elements in said brush rolls being inclined in the same direction;

certain of the brush rolls being rotatable in one direction and other of said brush rolls being rotated in an opposite direction;

said filament elements on each of said brush rolls being radially inclined to the direction of rotation of its brush roll.

14. An apparaus as stated in claim 13 wherein certain of said brush rolls are arranged to form an upwardly rising bank of rolls, the axes of said rolls extending along said bank.

15. An apparatus as stated in claim 14 wherein one of said bank of rolls rotates in one direction, and the other of said bank of rolls rotates in the opposite direction.

16. In an apparatus for conveying and treating globular articles; comprising the combination of:

a plurality of brush rolls arranged with their longitudinal axes in parallel, and in adjacent relation for supporting an article to be treated;

each brush roll including filament means comprising a plurality of filament sections having filament elements inclined to said longitudinal axes;

certain filament sections having filament elements oppositely inclined to elements of other sections;

certain of the brush rolls being rotatable in one direction and other of their brush rolls being rotated in an opposite direction.

17. An apparatus as stated in claim 16 wherein said filament elements in said filament sections are inclined in the direction of rotation of its respective brush roll.

18. In a brush roll construction for controlling the path of an article to be treated and for imparting an irregular tumbling action to such article to expose the entire surface of said article to brush treatment; the combination of:
- a rotatable core member defining a longitudinal axis;
- filament means on said core member and including a plurality of filament sections of selected axial length;
- one filament section having filament elements inclined toward one end of the core member;
- an adjacent filament section having filament elements inclined toward the other end of said core member.

19. A brush roll construction as stated in claim 18 wherein said filament elements of said filament sections are provided with inclination in the direction of rotation of said core member.

References Cited

UNITED STATES PATENTS

| | | | |
|---|---|---|---|
| 626,613 | 6/1899 | Hendrix | 15—3.2 |
| 2,244,110 | 6/1941 | Marsden | 15—179 |
| 2,753,583 | 7/1956 | Jepson. | |
| 2,907,063 | 10/1959 | Jones | 15—182 |
| 2,924,838 | 2/1960 | Jones et al. | 15—3.17 X |

FOREIGN PATENTS 550,214  12/1942  Great Britain.

EDWARD L. ROBERTS, Primary Examiner